(No Model.)
L. HOUZE.
FURNACE FOR MELTING GLASS.
No. 434,184. Patented Aug. 12, 1890.
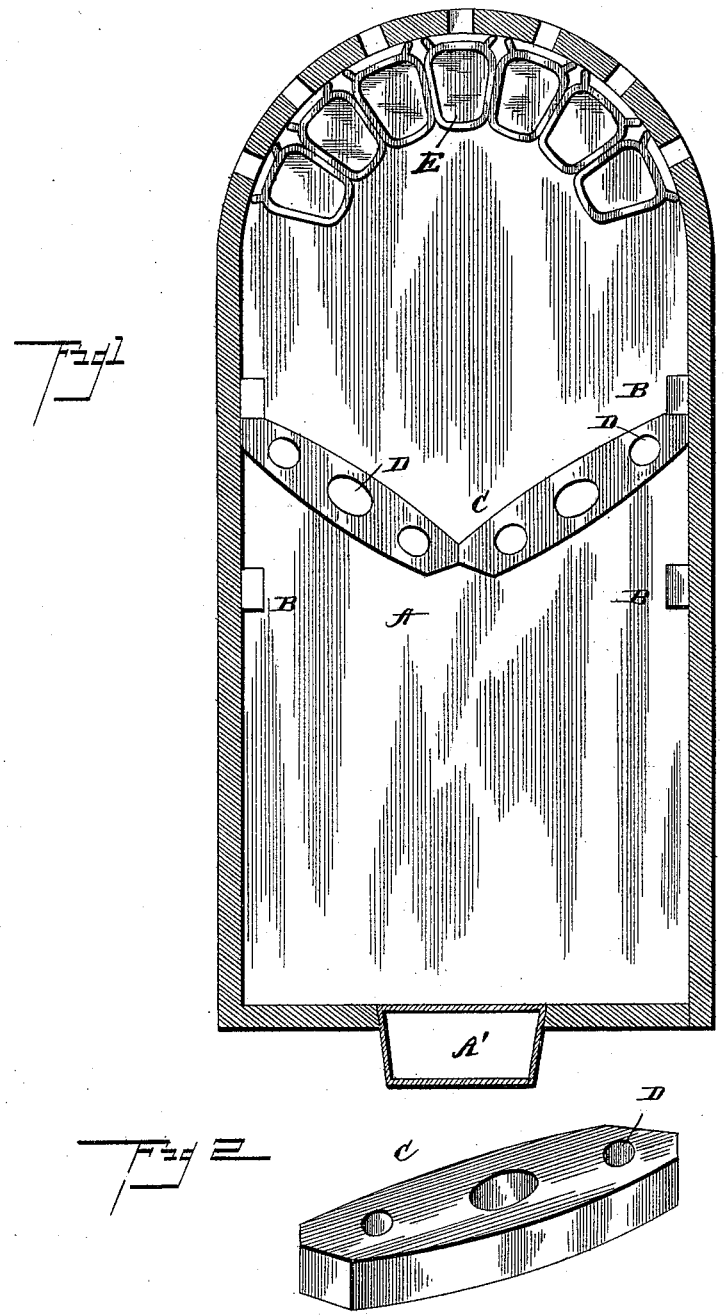
Witnesses
John Imirie
J. W. Garner
Inventor
Luke Houze
By his Attorneys
Barnd & Bishop

UNITED STATES PATENT OFFICE.

LUKE HOUZE, OF FOSTORIA, OHIO, ASSIGNOR OF TWO-THIRDS TO CHARLES FOSTER AND LEOPOLD MAMBOURG, OF SAME PLACE.

FURNACE FOR MELTING GLASS.

SPECIFICATION forming part of Letters Patent No. 434,184, dated August 12, 1890.

Application filed May 19, 1890. Serial No. 352,418. (No model.)

*To all whom it may concern:*

Be it known that I, LUKE HOUZE, a citizen of the United States, residing in the city of Fostoria, in the county of Seneca and State of Ohio, have invented certain new and useful Improvements in Furnaces for Melting Glass; and I declare the following to be a full, clear, and exact description of the invention, such as will enable others skilled in the art to which it appertains to make and use the same, reference being had to the accompanying drawings, and to letters of reference marked thereon, which form a part of this specification.

My present invention relates to improvements in floats or partition-screens for glass-melting furnaces; and it consists in certain novel features hereinafter described and claimed.

In the annexed drawings, which fully illustrate my invention, Figure 1 is a plan view of the tank having my improved device in its operative position therein. Fig. 2 is a perspective view of the float or partition.

The tank A may be of any desired size or form, having the usual smoke-stack A', and is provided on the inner faces of its side walls with the projections B B, as shown. The float C is constructed in two members having a combined length exceeding the width of the tank. The ends of the members are tapered somewhat, so that their outer ends will fit neatly into the angles formed by the walls of the tank and the projections thereon, while their outer ends fit closely together. By this arrangement the members are prevented from moving away from each other and will be held firmly in their proper position in the tank, as will be readily understood. The members of the float or partition are provided with the vertical openings D, which permit the impurities freed by the motion of the glass to rise to the surface of the float.

The gathering-rings E at the front end of the tank may be of any desired form. I have, however, illustrated a peculiarly-constructed ring which forms the subject-matter of another application, Serial No. 352,417, filed by me, of even date herewith.

The construction of my improved float or partition is very simple, and its operation and advantages will be readily understood. As the glass is removed from the front end of the tank, the glass left therein is caused to flow toward said front end, and consequently the impurities floating on the surface of the glass are brought against the float or partition and arrested by the same, so as to be prevented from being carried to the front end of the tank. It has been found that in practice some of the impurities would be carried under the float and freed by the motion of the flowing glass, and thus the object of the float or partition would be defeated to a certain degree. In my device such impurities as are carried under the float and freed will be permitted to rise through the vertical openings in the float and will be there held until volatilized and carried off through the smoke-stack. Heretofore the float or partition has been constructed in one single body, and it was found that in practice the motion of the flowing glass would cause the device to move from its position and float around in the tank, thus rendering it practically of no value. This objection is entirely overcome by the use of my device, as the float is constructed in two members having a combined length greater than the width of the tank, and consequently the motion of the flowing glass will serve only to hold the float more firmly in its position.

My device is very simple in its construction, and its advantages are thought to be obvious from the foregoing description, taken in connection with the accompanying drawings.

Having thus described my invention, what I claim, and desire to secure by Letters Patent, is—

1. The combination, with the tank, of the floating partition composed of two members having a combined length exceeding the width of the tank, and having their inner ends bearing against each other and their outer ends bearing against the walls of the tank, substantially as set forth.

2. A floating partition or screen for glass-melting furnaces provided with vertical openings, substantially as and for the purposes set forth.

3. The combination, with the tank having inwardly-extending projections on its side walls, of the floating partition consisting of two members having their inner ends bearing against each other and their outer ends resting in the angles formed by the projections and the walls of the tank, the combined length of said members exceeding the width of the tank, substantially as described.

In testimony whereof I hereunto affix my signature in the presence of two witnesses.

LUKE HOUZE.

Witnesses:
A. W. AYLSWORTH,
LEWIS WADE.